United States Patent [19]

Babbs

[11] 3,844,614

[45] Oct. 29, 1974

[54] SEAT CUSHION

[75] Inventor: Frederick William Babbs, Nottingham, England

[73] Assignee: Cox of Watford Limited, Nottingham, England

[22] Filed: Mar. 29, 1973

[21] Appl. No.: 345,973

[30] Foreign Application Priority Data
Mar. 30, 1972 Great Britain.................... 15105/72

[52] U.S. Cl.................... 297/452, 5/353.1, 297/458
[51] Int. Cl......... A47c 3/00, A47c 7/02, B60n 1/06
[58] Field of Search........... 297/452, 454, 457, 458; 5/353.1-353.8

[56] References Cited
UNITED STATES PATENTS

| | | | |
|---|---|---|---|
| 3,216,029 | 11/1965 | Fritzmeier | 5/353.1 |
| 3,363,943 | 1/1968 | Getz et al. | 297/452 |
| 3,633,968 | 1/1972 | Sears, Jr. | 5/353.2 |
| 3,758,159 | 9/1973 | Morris | 297/455 |

Primary Examiner—Casmir A. Nunberg
Attorney, Agent, or Firm—Brumbaugh, Graves, Donohue & Raymond

[57] ABSTRACT

A seat cushion comprising an outer skin, and soft flexible padding fixed within the skin and characterised by an engagement section fixed or integral around a fixing edge of the skin where the skin is free from the padding for engagement in a corresponding rim around a seat frame, whereby the cushion can be removably secured to the seat frame by engagement in the seat frame rim, or can present a smooth external appearance by engagement of the section in an exposed rim of a seat frame embodied within the cushion.

16 Claims, 13 Drawing Figures

SEAT CUSHION

This invention relates to a seat cushion, for example for a seat in a motor vehicle.

According to the present invention a cushion comprises a skin, flexible padding secured within the underside of the skin, and an engagement section fixed or integral around a fixing edge of the skin where the skin is free from the padding, for engagement in a corresponding rim around a seat frame.

This type of cusion is particularly suitable if it is required to be removed from the seat frame for replacement or repair since the engagement section can be simply removed from the rim to release the cushion. It also simplifies manufacture since the frame and the cushion can be manufactured separately and simply and quickly assembled together.

The cushion may be for a seat part or a back part of could be a combined cushion for both a seat part and a back part.

However the invention includes the case in which the flexible padding is moulded around the frame whether a seat frame or a back frame and within the skin to bond the skin to the frame. In that case the engagement section can engage in the rim around the seat frame which has had to be exposed during moulding to hold the frame externally of the mould, and then after moulding engagement of the engagement section will give the completed cushion and frame a pleasant external apperance.

The engagement section is preferably hook-shaped or U-shaped in section for easy engagement with the rim and the rim may be defined by a curved-over edge on the frame so that the two components conveniently hook together. Thereafter a locking strip may be inserted in the curved-over edge adjacent the engagement section to prevent disengagement and to complete the external appearance. The locking strip may be hollow and may have external ribs ensuring a good grip.

The flexible padding is conveniently a soft foam plastics material and in the case of a seat back the back frame may include a moulded semi-rigid foam plastics material capable of forming a shock absorbing crash pad for protecting occupants of the rear seats. The soft cushion would be removable from the complete frame including such a crash pad.

The invention may be carried into practice in various ways, and the manufacture of two types of car seat and some modifications will now be described by way of example, with reference to the accompanying drawings, of which:

Figure 1:
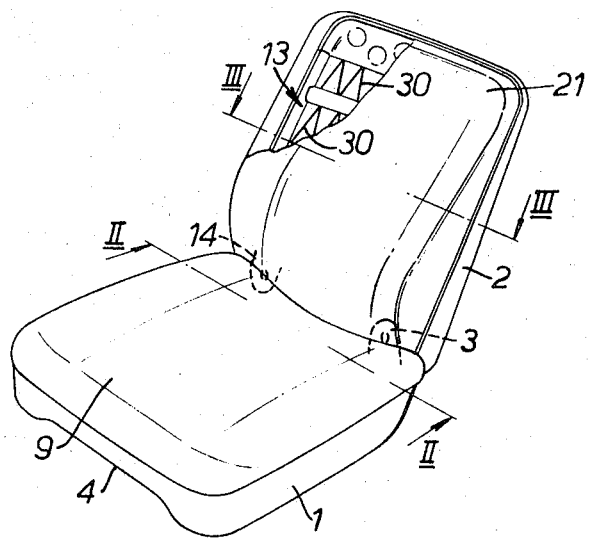
FIG. 1 is a perspective view of a car seat.

The seat shown in FIG. 1 is made in two parts, a seat part 1 and back part 2, which are connected by hinges 3, one at each side.

The seat part 1 includes a sheet metal base pan 4; other materials of which the base pan could be made include moulded thermoplastic and thermosetting plastics. Two reinforcing plates 5 are welded to the base 4, and a bracket 6, which forms the lower member of the corresponding hinge 3, is welded to each of the reinforcing plates 5. Brackets 8 for fixing the seat to the floor of the vehicle are also welded to the base 4.

The pan 4 is formed with a curved over edge 7 for attachment of a cushion as described below.

Figure 2:
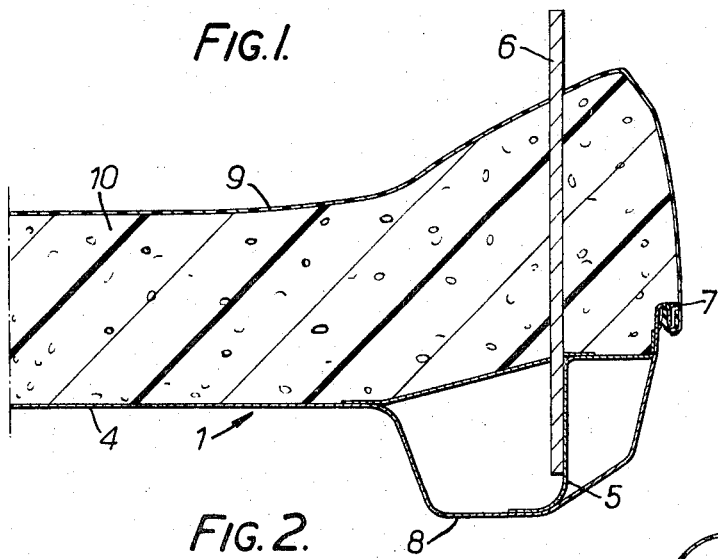
FIGS. 2 and 3 are sections on the lines II—II and III—III in FIG. 1, respectively.
Figure 4:
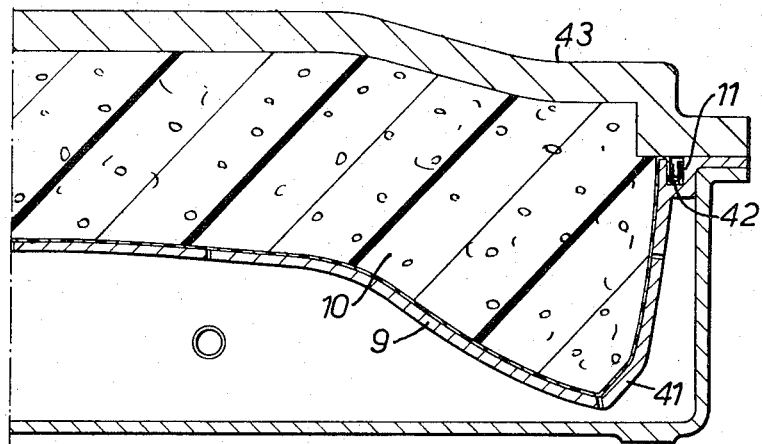
FIGS. 4 and 5 are sections showing steps in the manufacture respectively of the seat part and the back part of the seat of FIG. 1.

The cushion, as shown in FIG. 2, consists of a preshaped woven cloth or simulated leather cloth cover 9, which is infilled with flexible padding material 10; which may be polyurethane foam, although other materials could be used. In making the cushion, the cover 9 is first shaped, and an elongate trim edging engagement section 11 is welded around the edge of the cover 9 by a radio frequency process, which also perforates the material of the cover outside the edging section, allowing the waste material to be torn away. The cover 9 is then inserted in the lower half of a mould 41 as shown in FIG. 4, with the edging section 11 located in a groove 42. The space below the cover 9 is evacuated to ensure that the cover 9 is in contact with the mould, the ingredients for the flexible foam 10 are mixed and placed in the mould and the top half 43 of the mould is locked in place. After curing, the foam infilling 10 will be firmly bonded to the cover 9, forming a cushion, with the cover 9, the infilling 10 and the edging section 11 integrally united.

Figure 6:
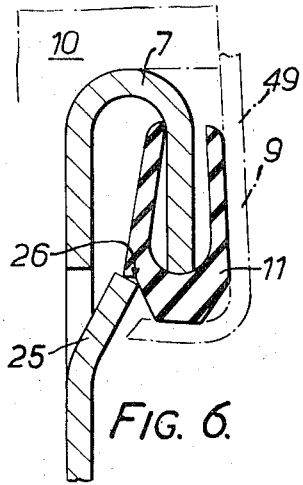
FIG. 6 is a detailed section of the edge of the seat cushion of FIG. 1.

As can be seen from FIG. 6, the edging section 11 is basically U-shaped. To fix the cushion to the base pan 4, the edging section 11 is hooked over the curved over edge 7 of the base pan. The edging section is held locked in place by lanced tags 25 which were originally pressed out of the base pan 4, and engage a surface 26 of the edging section 11 when it is hooked in place.

There is a strip 49 of the cover 9 protruding from the foam 10 and carrying the section 11; this strip is flexible and assists in locking the section 11 in the curved over edge 7.

Figure 7:
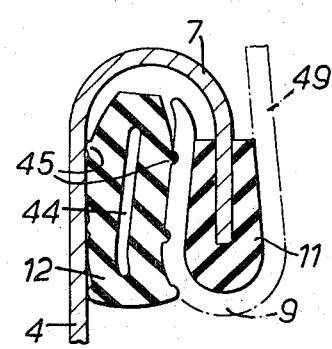
FIGS. 7 and 8 are views, similar to FIG. 6, of alternative forms of cushion edge.

An alternative method of locking the edging section in place is shown in FIG. 7. The edging section used with this method is similar to that shown in FIG. 6, but instead of being retained by lanced tags, a plastic locking strip 12 is squeezed into place between the base pan 4 and the cover 9. The strip 12 has a hollow core 44 and external ribs 45 enabling it to grip the neighbouring surfaces.

Figure 8:
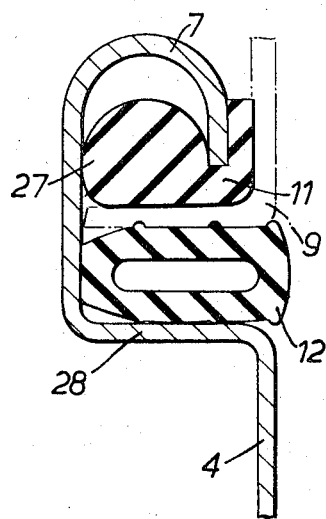

A further alternative method of locking the edging section in place is shown in FIG. 8. In this case, the edging section 11 is essentially U-shaped, but the leg of the U nearer the edge of the cover 9 is formed as a circular bead 27. The base pan 4 is cranked inwardly just below the curved over edge, as shown at 28 in FIG. 8. On assembly, the edging section 11 is hooked over the edge of the base pan. The bead 27 occupies practially the whole of the space within the curved over edge 7; to lock the edging section in place, a plastic locking strip 12 is squeezed into place below the edging section.

Figure 3:
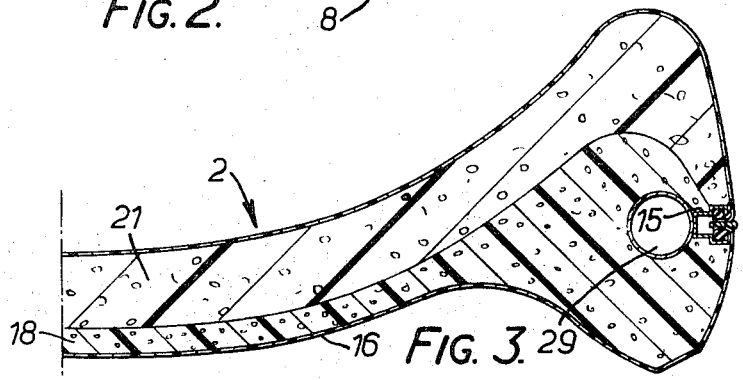

The back part 2 includes a rigid frame 13, which, in this example, is constructed of metal tubes 29 and plates welded together as indicated generally in FIG. 3. Two generally vertical side tubes lead at their lower ends into lugs 14 which form the upper members of the hinges 3.

A flanged metal section 15 is welded around the edge of the frame. As can be seen from FIG. 9, the section 15 is symmetrical about the general plane of the seat back, having two curved over edges 7.

The frame 13 is enclosed by a crash pad 18 composed of semi-rigid polyurethane foam, at the back and a soft squab pad 21 at the front. The crash pad 18 also provides the general support for the squab pad 21; in the regions where the heaviest loads are expected, serpentine springs 30 are connected between the tubes 29 and embedded in the crash pad 18.

Figure 5:
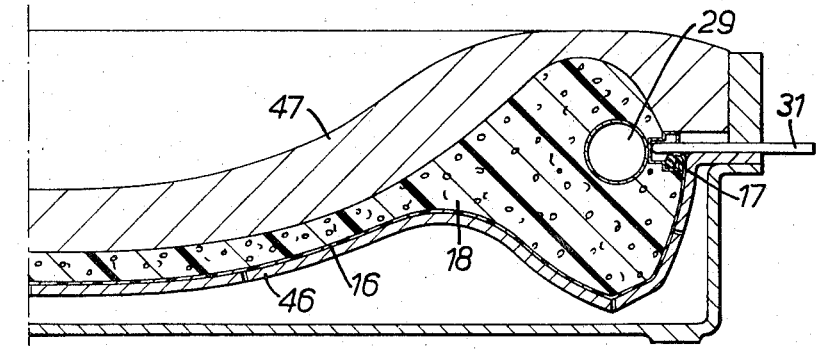
Figure 9:
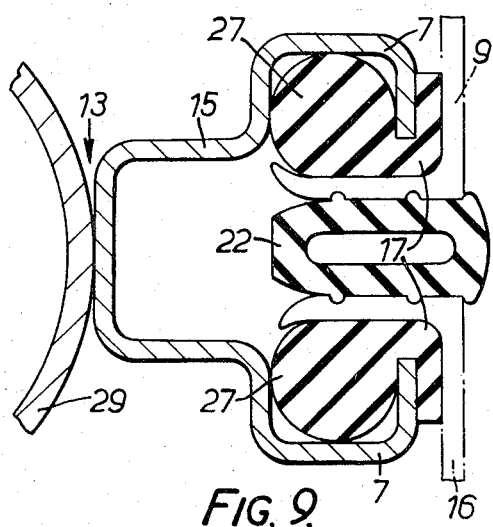
FIG. 9 is a detailed section of the edge of the back of the seat of FIG. 1.

In making the crash pad 18, a leather cloth cover 16 is first shaped, and an edging section 17 of the shape shown in FIG. 8 is welded around the edge, exactly as described for the seat cushion. The cover 16 is then placed around the back of the frame 13, and the bead 27 inserted into the curved over part of the section 15. The assembly of the frame 13 and cover 16 is placed in the lower half 46 of a mould, as shown in FIG. 5, and the space below the cover is evacuated to ensure that it is in contact with the mould. Instead of being located by the edging section 17, the assembly is located by locating plates 31 which engage in the metal section 15. The ingredients for the semi-rigid foam are then mixed and placed in the mould, and the top half 47 of the mould is locked in place. After curing, the complete crash pad is removed from the mould, and is trimmed with a squab pad 21 made in exactly the same way as was described for the seat cushion. The edging section shown in FIG. 8 is used for the squab pad, and, as shown in FIG. 9 this is engaged in the metal section 15 on assembly. Finally a plastic locking strip 22 is squeezed into place between the crash pad and the squab pad, to lock the edging section in place, and provide a neat finish.

It is to be noted that the frame 13 and crash pad 18 constitute the back support for the squab pad 21 for the occupant of the seat, and also act as a crash pad for a person in the seat behind. The frame 29 will be tapered upwardly, or built up from pieces of successively smaller cross-section, to have appropriate energy-absorbing characteristics on deformation.

It is also to be noted that the seat cushion and squab pad can easily be removed from the base pan 4 and frame 29; thus they can be replaced by new parts if they are ever damaged, or become worn.

In a modification the back part 2 does not have a separate semi-rigid crash pad, but is filled entirely with soft foam.

Figure 10:
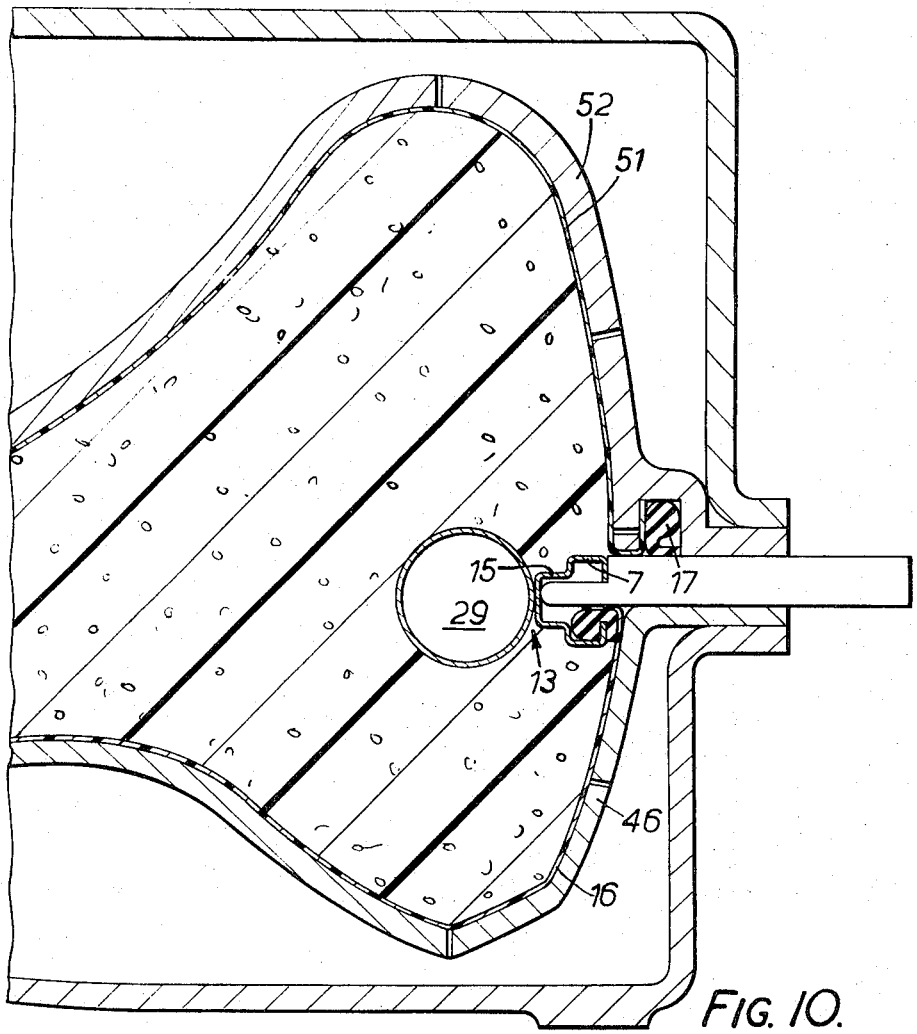
FIG. 10 is a view corresponding to FIG. 5 showing the manufacture of a modified seat back.

As shown in FIG. 10 the cover 16 and the frame 13 are fitted in the lower part of the mould 46 as described with reference to FIG. 5. The front cover 51 is fitted into the top part of the mould 52 with the edging section 17 engaged in a groove around the mould cavity; vacuum is applied to hold the cover 51 in place. The ingredients for the foam filling are placed in the mould which is then closed, after which the plastic is cured.

After removal from the mould, the edging section 17 attached around the edge of the front cover is tucked into the empty curved over edge 7, and the locking strip 22 inserted, all as described with reference to FIG. 9. Although the front of the back part 2 would not be removable from the rest of the back part, the complete back part would be removable from the seat base by release of the hinges 3.

The hinged connection between the seat base and the back part of any of the foregoing embodiments could be of the type shown in British Patent Application No. 16937/71 (Case 22). Such a hinge allows the reclining angle of the back part to be adjusted, and also allows the back part to be tilted forward without upsetting the adjustment of the reclining angle.

Figure 11:
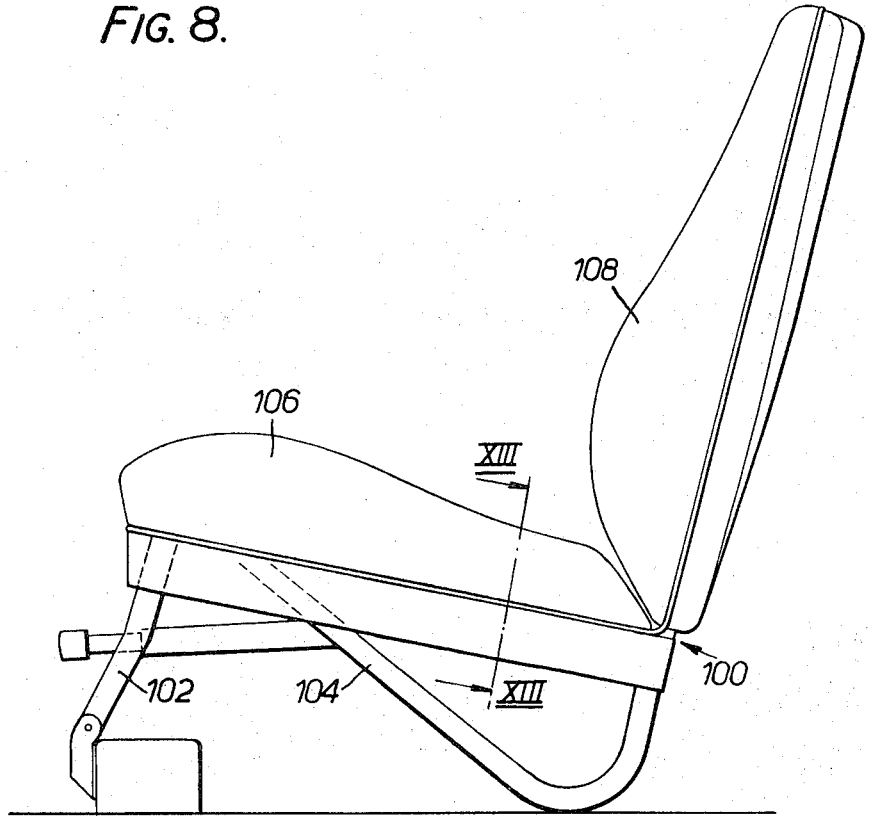
FIG. 11 is a side elevation of a second type of car seat.
Figure 12:
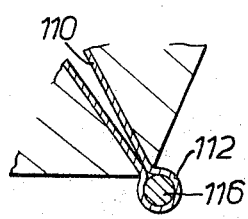
FIG. 12 is a partial section of the seat of FIG. 11, looking in the same direction as in FIG. 11.
Figure 13:
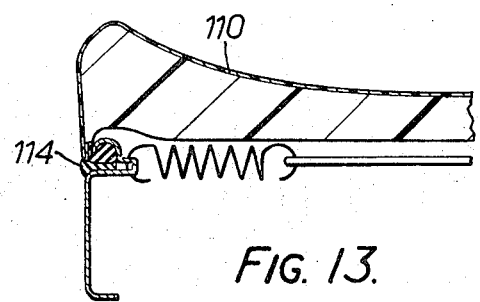
FIG. 13 is a section on the line XIII—XIII in FIG. 11.

The car seat shown in FIGS. 11 and 12 includes a frame 100 which has both seat and squab portions, rigidly connected together. The seat portion is provided with front support legs 102 which are pivotally connected to the floor of the car in which the seat is fitted, and rear support legs 104 which simply rest on the floor of the car. Thus the seat can be tilted forward when necessary.

The frame is provided with transverse springs (not shown) which provide support for a seat cushion 106 and a back cushion 108. The cushions are made in the same way as those previously described, except that the cover 110 is made in one piece for the two cushions.

An edging section of the type shown in FIG. 8 is welded around the edge of the cover 110, while that part of the cover between the two cushions is welded to itself to form a sleeve 112, as shown in FIG. 12. The frame 100 is provided with a curved-over edge, exactly as shown in FIG. 8, around its edge; on assembly, the edging section is fitted into the curved-over edge and secured by a locking strip 114, exactly as previously described. This secures each cushion to the frame along three of its four sides; on the fourth side, they are secured by a trim wire 116 which is passed through the sleeve 112 and attached to the frame at each edge.

The edging section shown in FIG. 6 or FIG. 7 could be used instead of that shown in FIG. 8; in this case, the shape of the edge of the frame 100 would be modified accordingly.

What I claim as my invention and desire to secure by Letters Patent is:

1. A seat comprising a relatively rigid frame, the frame defining a well for a cushion and formed with a rim around the well, the rim having a hook-like cross section, a cushion having a flexible external skin, soft flexible padding fixed within the skin, an engagement section fixed around the edge of the skin, and a neck of the skin between the edge of the padding and the engagement section permitting the engagement section to be manipulated in relation to the padding, the cushion being removably secured to the frame by engagement of the engagement section in the rim of hook-like cross section, and a locking strip press-fitted into a gap between the engagement section and the rim preventing dis-engagement of the engagement section.

2. A seat as claimed in claim 1 in which the engagement section is formed with an integral external bead for insertion in the rim.

3. A seat as claimed in claim 1 in which both the frame and the cushion are in two portions, a seat portion and a back portion, the two portions of the cushion being connected together by a part of the skin.

4. A seat as claimed in claim 1 in which the frame has a back portion including a crash pad of moulded semi-rigid foam plastics material.

5. A seat as claimed in claim 1 in which the rim has a cranked portion leading to the hook-like section.

6. A seat as claimed in claim 1 in which the locking strip is a length of beading with a hollow cross-section and with external ribs for gripping it in position.

7. A seat comprising a relatively rigid frame, the frame defining a well for a cushion and formed with a rim around the well, the rim having a hook-like cross section, a cushion having a flexible external skin, soft flexible padding fixed within the skin, an engagement section fixed around the edge of the skin, and a neck of the skin between the edge of the padding and the engagement section permitting the engagement section to be manipulated in relation to the padding, the cushion being removably secured to the frame by engagement of the engagement section in the rim of hook-like cross-section, and tags formed in the rim and preventing dis-engagement of the engagement section from the hook-like part of the rim.

8. A seat as claimed in claim 7 in which the engagement section is formed with an integral external bead for insertion in the rim.

9. A seat as claimed in claim 7 in which both the frame and the cushion are in two portions, a seat portion and a back portion, the two portions of the cushion being connected together by a part of the skin.

10. A seat as claimed in claim 7 in which the frame has a back portion including a crash pad of moulded semirigid foam plastics material.

11. A seat as claimed in claim 7 in which the rim has a cranked portion leading to the hook-like section.

12. A cushion for a seat frame defining a well for the cushion and formed with a rim around the well, the rim having a hook-like cross-section, the cushion comprising a flexible external skin, soft flexible padding bonded to an inner surface of the skin, an engagement section fixed around the edge of the skin, and a neck of the skin extending from the edge of the padding to the engagement section permitting the engagement section to be manipulated in relation to the padding.

13. A cushion as claimed in claim 12 in which the engagement section is formed with an integral external bead for insertion in the rim.

14. A cushion as claimed in claim 12, in two portions, a seat portion and a back portion, the two portions having distinct and separate paddings and being connected together by a part of the skin.

15. A cushion comprising a flexible external skin, soft flexible padding bonded to an inner surface of the skin, which padding is moulded around a relatively rigid frame, an engagement section fixed around the edge of the skin, and a neck of the skin extending from the edge of the padding to the engagement section permitting the engagement section to be manipulated in relation to the padding, the engagement section being engaged in a rim of the frame which is exposed after moulding of the cushion, the skin being in two portions on either side of the padding.

16. A cushion as claimed in claim 15 including a locking strip pressed into a gap between the engagement section and the rim preventing dis-engagement of the engagement section.

* * * * *